United States Patent [19]

Hendon

[11] 4,026,435
[45] May 31, 1977

[54] DISPOSABLE COOKWARE

[76] Inventor: Joseph S. Hendon, P.O. Box 2524, Gulfport, Miss. 39501

[22] Filed: July 24, 1975

[21] Appl. No.: 598,729

[52] U.S. Cl. .............................. 220/85 H; 99/403; 206/549; 220/94 R
[51] Int. Cl.² ...................................... B65D 25/28
[58] Field of Search ................ 220/94 R, 96, 85 H, 220/85 R; 206/541, 544, 546, 549; 294/31.2, 27 R; 99/403, 416

[56] References Cited

UNITED STATES PATENTS

| 780,586 | 1/1905 | Thurston | 220/85 H |
| 3,101,857 | 8/1963 | Freedman | 220/85 H |
| 3,156,105 | 11/1964 | Bahner | 206/544 |
| 3,431,007 | 3/1969 | Paulsen et al. | 294/31.2 |
| 3,692,346 | 9/1972 | Simms | 220/85 H |

Primary Examiner—William Price
Assistant Examiner—Joseph M. Moy
Attorney, Agent, or Firm—Brady, O'Boyle & Gates

[57] ABSTRACT

Disposable cookware including a disposable container having a removable handle assembly, and a removable leg assembly for supporting the container over a source of heat while cooking.

10 Claims, 6 Drawing Figures

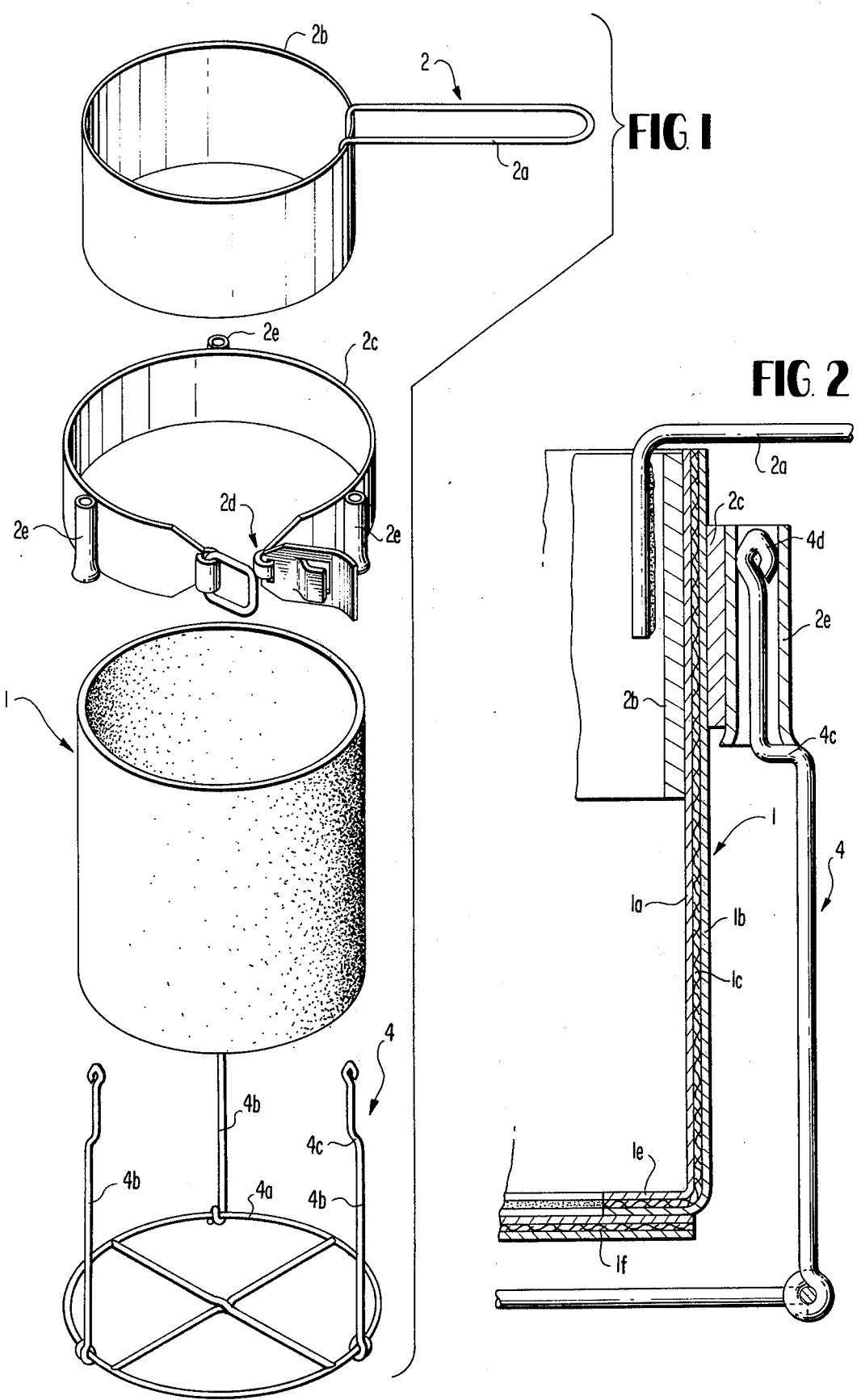

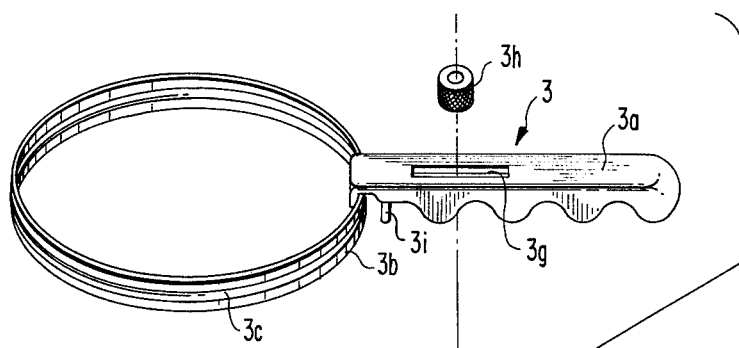
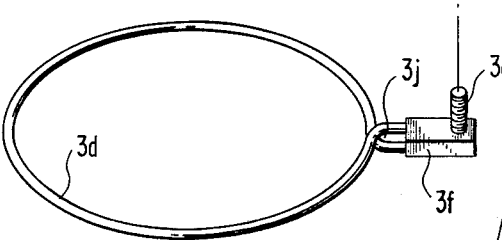
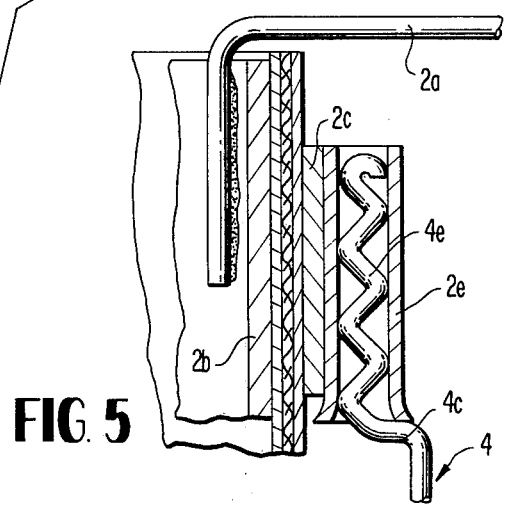
FIG. 3
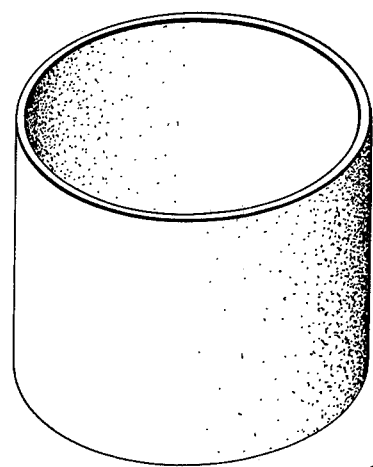
FIG. 5
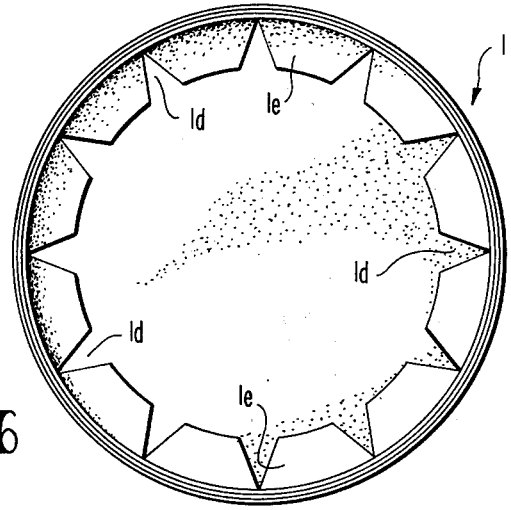
FIG. 6
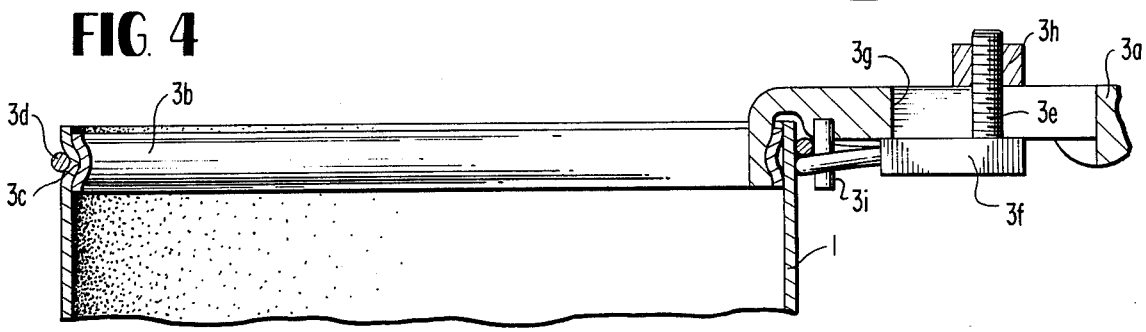
FIG. 4

DISPOSABLE COOKWARE

BACKGROUND OF THE INVENTION

In today's world of outdoor living, there is a need for cookware which can be packed in a minimum of space for transport with the camping equipment, and which, after use, can be disposed of in a minimum of time, thus providing the user with more time for fishing, hiking, hunting and the like.

After considerable research and experiment, the disposable cookware of the present invention has been devised which comprises, essentially, a disposable container having a removable handle assembly, whereby, after use, the handle may be removed from the container and the container may be discarded. In one embodiment of the invention, a removable leg assembly is operatively connected to the handle assembly for supporting the container over a source of heat while cooking.

BRIEF DESCRIPTION OF THE DRAWINGS.

FIG. 1 is an exploded, perspective view of one embodiment of the invention showing the removable handle assembly, disposable container and removable leg assembly;

FIG. 2 is a fragmentary, sectional view showing the cookware of FIG. 1 in the assembled position;

FIG. 3 is an exploded, perspective view of another embodiment of the invention showing the removable handle assembly and the disposable container;

FIG. 4 is a fragmentary, sectional view showing the cookware of FIG. 3 in the assembled position;

FIG. 5 is a fragmentary, sectional view showing a modification of the upper end of the leg assembly as shown in FIG. 2; and FIG. 6 is a top plan view of the disposable container with the bottom wall removed therefrom.

DESCRIPTION OF THE PREFERRED EMBODIMENT

Referring to the drawings, and more particularly to FIGS. 1 and 2 thereof, the disposable cookware of the present invention comprises a disposable container 1 formed from a laminate structure of inner and outer paper plies 1a, 1b and an intermediate cloth layer 1c. The bottom edge portion of the container side wall is provided with a plurality of notches 1d (FIG. 6) turned inwardly to form a flange portion 1e to which the laminated bottom wall 14 is bonded.

The removable handle portion 2 comprises a hand grip member 2a secured to a sleeve 2b adapted to be inserted into the container and abut the inner wall thereof as shown in FIG. 2. In order to hold the sleeve and associated hand grip in tight engagement against the inner wall of the container, a locking band 2c is provided which encircles the container around the outer wall thereof. The band 2c is provided with a toggle-type lock 2d which, when activated, contracts the band around the outer wall whereby the container wall is tightly gripped between the sleeve 2b and the band 2c. The band 2c is also provided with a plurality of tubular members 2e for receiving the upper ends of supporting legs, to be described more fully hereinafter.

Another embodiment of the removable handle assembly 3 is shown in FIG. 3 wherein the hand grip 3a is secured to a sleeve 3b having an annular groove 3c formed in the outer peripheral surface thereof, the sleeve 3b being insertable within the container 1 (FIG. 4) and abutting the inner wall thereof. To hold the sleeve in tight engagement against the inner wall of the container, a locking band in the form of a flexible cable 3d is provided which encircles the container around the outer wall thereof. A threaded stud 3e is connected to the cable by a plate member 3f, the threaded stud extending upwardly through a slot 3g formed in the hand grip, and having a knurled nut 3h threaded thereon. The hand grip 3a is also provided with a depending dowel 3i which is adapted to engage the bight portion 3j of the overlapping ends of the flexible cable 3d. To secure the handle assembly 3 to the container 1, the sleeve 3b carrying the hand grip 3a is inserted into the container as shown in FIG. 4 and the flexible cable 3d is positioned around the outer peripheral surface of the container. The dowel 3i is positioned as shown in FIG. 4 and the knurled nut 3h on the end of the threaded stud 3e is pulled rearwardly in the direction of the free end of the hand grip causing the stud to slide in the slot 3g, thereby causing the cable 3d to press the container side wall into the groove 3c in the sleeve 3b. The knurled nut 3h is then tightened against the upper surface of the hand grip whereby the container side wall is maintained tightly gripped between the sleeve 3b and cable 3d.

In some instances when it is desired to support the container 1 so that the bottom 1f thereof is disposed above the heating surface, such as the eye of a grill or stove, the handle assembly 2 is provided with a leg assembly as shown in FIGS. 1 and 2. The leg assembly comprises a wire ring base 4a having wire leg members 4b connected to the ring along the circumference thereof. The legs are wound around the ring in such a manner that they are hingedly connected to the ring so that they can be folded into the plane of the ring for storage purposes. The upper end portion of each leg is bent inwardly to form a shoulder 4c which abuts the lower end of the tubular member 2e, thus providing a seat for the tubular member. The upper end of each leg is provided with a reversely bent portion 4d which engages the inner wall of the tubular member 2e with a friction fit, whereby the leg assembly is held in position when the cookware is grasped by the handle and lifted.

To enhance the friction fit of the leg members in the tubular members 2e, the upper portion of each leg may be provided with an undulated configuration 4e (FIG. 5) whereby the portion of the leg engages the inner wall of the tubular member 2e at a plurality of points. While only three leg members 4b are shown, it will be appreciated by those skilled in the art that any number of legs may be employed depending upon the size of the container being supported and the number of tubular members 2e provided on the band 2c. Furthermore, while the legs 4b are shown wrapped around the ring base 4a, other types of hinge connections may be employed; however, the illustrated embodiment is preferred since the legs can also be slid along the circumference of the ring base for aligning the legs with the tubular members 2e.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. Disposable cookware including a disposable container, and a removable handle assembly connected to said container, said removable handle assembly comprising a hand grip member connected to a sleeve, said sleeve being inserted into the container and abutting the inner wall of said container, a contractable locking band encircling the outer wall of the container, and locking means operatively connected to said locking band for contracting and tightening the locking band around the container whereby the side wall of the container is tightly gripped between the sleeve and locking band.

2. Disposable cookware according to claim 1 wherein the disposable container is formed from a laminate structure having inner and outer plies of paper and an intermediate layer of cloth.

3. Disposable cookware according to claim 1 wherein the locking band comprises a flexible cable.

4. Disposable cookware according to claim 3 wherein the locking means comprises a threaded stud connected to said flexible cable, a slot formed in the hand grip, said stud extending through said slot, and a nut secured to the end of the stud for fastening the stud at a selected position on the hand grip.

5. Disposable cookware according to claim 1 wherein the locking means comprises a toggle-type lock for contracting the band around the outer peripheral wall of the container.

6. Disposable cookware according to claim 1 wherein a removable leg assembly is operatively connected to the locking band for supporting the bottom wall of the container above a heating surface.

7. Disposable cookware according to claim 6 wherein the removable leg assembly comprises, a base, a plurality of vertically extending legs connected to said base, the upper ends of the legs being detachably connected to said locking band.

8. Disposable cookware according to claim 7 wherein the base comprises a ring member, the lower ends of the legs being hingedly connected to the ring member, a plurality of tubular members secured to said locking band, the upper ends of the legs being received in said tubular members with a friction fit.

9. Disposable cookware according to claim 8 wherein each leg is formed with an inwardly bent portion forming a shoulder to provide a seat for the end of the tubular members.

10. Disposable cookware according to claim 7 wherein the upper end of each leg is formed with an undulating configuration whereby the upper end portion of the leg engages the inner wall of the tubular member at a plurality of points to thereby enhance the friction fit thereof.

* * * * *